United States Patent
Raman et al.

(10) Patent No.: US 9,327,645 B2
(45) Date of Patent: May 3, 2016

(54) PROVIDING ALERTS FOR OBJECTS LEFT IN A VEHICLE

(71) Applicant: Harman International Industries, Incorporated, Stamford, CT (US)

(72) Inventors: Prakash Raman, Bangalore (IN); Sreejit Gopinath, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 148 days.

(21) Appl. No.: 14/012,809

(22) Filed: Aug. 28, 2013

(65) Prior Publication Data

US 2015/0061856 A1 Mar. 5, 2015

(51) Int. Cl.
*B60Q 1/00* (2006.01)
*B60Q 9/00* (2006.01)
*G08B 21/24* (2006.01)

(52) U.S. Cl.
CPC . *B60Q 9/00* (2013.01); *G08B 21/24* (2013.01)

(58) Field of Classification Search
None
See application file for complete search history.

(56) References Cited

U.S. PATENT DOCUMENTS

| | | | | |
|---|---|---|---|---|
| 4,897,632 | A * | 1/1990 | Hock | B60Q 9/001 180/286 |
| 6,888,265 | B2 * | 5/2005 | Turner et al. | 307/10.2 |
| 8,659,414 | B1 * | 2/2014 | Schuk | 340/457 |
| 8,941,478 | B2 * | 1/2015 | Mirle et al. | 340/425.5 |
| 2009/0027188 | A1 * | 1/2009 | Saban | 340/521 |
| 2009/0076675 | A1 * | 3/2009 | Desjardins | 701/29 |
| 2011/0084807 | A1 * | 4/2011 | Logan et al. | 340/10.1 |
| 2011/0285524 | A1 * | 11/2011 | Qian | B60K 28/066 340/457 |
| 2013/0012123 | A1 * | 1/2013 | DeLuca | 455/39 |
| 2013/0109342 | A1 * | 5/2013 | Welch | B60N 2/002 455/404.2 |
| 2013/0194089 | A1 * | 8/2013 | Estrada | 340/457.1 |
| 2014/0011482 | A1 * | 1/2014 | Le | G08B 19/00 455/414.1 |
| 2014/0055276 | A1 * | 2/2014 | Logan et al. | 340/686.6 |
| 2014/0253314 | A1 * | 9/2014 | Rambadt et al. | 340/457.1 |

FOREIGN PATENT DOCUMENTS

KR 1020060067992 A 6/2006

* cited by examiner

*Primary Examiner* — Julie Lieu
(74) *Attorney, Agent, or Firm* — Alleman Hall McCoy Russell & Tuttle LLP

(57) ABSTRACT

Embodiments are disclosed for a method of alerting a user to the presence of a mobile device in a vehicle. In some example embodiments, a method includes identifying, via an in-vehicle computing system of a vehicle, presence of a mobile device. The method further includes providing an alert responsive to the user exiting the vehicle when the mobile device is still located in the vehicle.

18 Claims, 9 Drawing Sheets

PROVIDING ALERTS FOR OBJECTS LEFT IN A VEHICLE

FIELD

The disclosure relates to providing alerts for objects left in a vehicle.

BACKGROUND

Users may enter a vehicle with one or more objects, such as mobile devices, and store such objects throughout the vehicle while travelling. While travelling in the vehicle, a user may interact with one or more vehicle systems via communications between a mobile device and an in-vehicle computing system. The in-vehicle computing system may interface with a speaker system of the vehicle to play media content, conduct phone calls for the user, and provide information to the user, among other features. For example, the in-vehicle computing system may provide information regarding weather, traffic, driving directions, vehicle diagnostics, and the like. Upon completion of a trip, the user may overlook the presence of one or more mobile devices in the vehicle, and exit the vehicle without removing the one or more mobile devices.

SUMMARY

Embodiments are disclosed for a method of alerting a user to the presence of a mobile device in a vehicle. In some example embodiments, a method includes identifying, via an in-vehicle computing system of a vehicle, presence of a mobile device. The method further includes providing an alert responsive to the user exiting the vehicle when the mobile device is still located in the vehicle.

In other embodiments a method of alerting a user to a presence of a mobile device in a vehicle includes connecting a plurality of mobile devices to an in-vehicle computing system, receiving information from each mobile device indicating one or more of a user presence and a mobile device presence, and receiving information from one or more vehicle systems of the vehicle. The method further includes detecting user exit while at least one mobile device is present, detecting that the vehicle is shut down, and alerting the user that the at least one mobile device is located in the vehicle.

An in-vehicle computing system for performing one or more of the methods described in the present disclosure may include a processor, an inter-vehicle communication module, an external device interface, and a storage device. The storage device may store instructions executable by the processor to connect to a mobile device via the external device interface, receive information from the mobile device indicating one or more of a user presence and a mobile device presence, and receive information from one or more vehicle systems of a vehicle via the inter-vehicle communication module. The instructions may further be executable by the processor to detect vehicle shut down and provide an alert that the mobile device is located in the vehicle.

BRIEF DESCRIPTION OF THE DRAWINGS

The disclosure may be better understood from reading the following description of non-limiting embodiments, with reference to the attached drawings, wherein below.

DETAILED DESCRIPTION

As discussed above, a user may enter a vehicle with one or more objects, such as mobile devices. The user may also interact with an in-vehicle computing system (e.g., via the mobile device) before, during, and/or after travel to perform various functions related to the vehicle systems, mobile devices, and/or other elements. However, the user may overlook the objects and/or fail to remember the location of each object, and exit the vehicle without removing each of the objects from the vehicle. In order to identify the presence and/or location of one or more objects, such as mobile devices, in the vehicle, the in-vehicle computing system may interact with the vehicle systems and/or mobile devices to determine that a user exits or intends to exit and generate an alert recognizable to the user.

Figure 1:
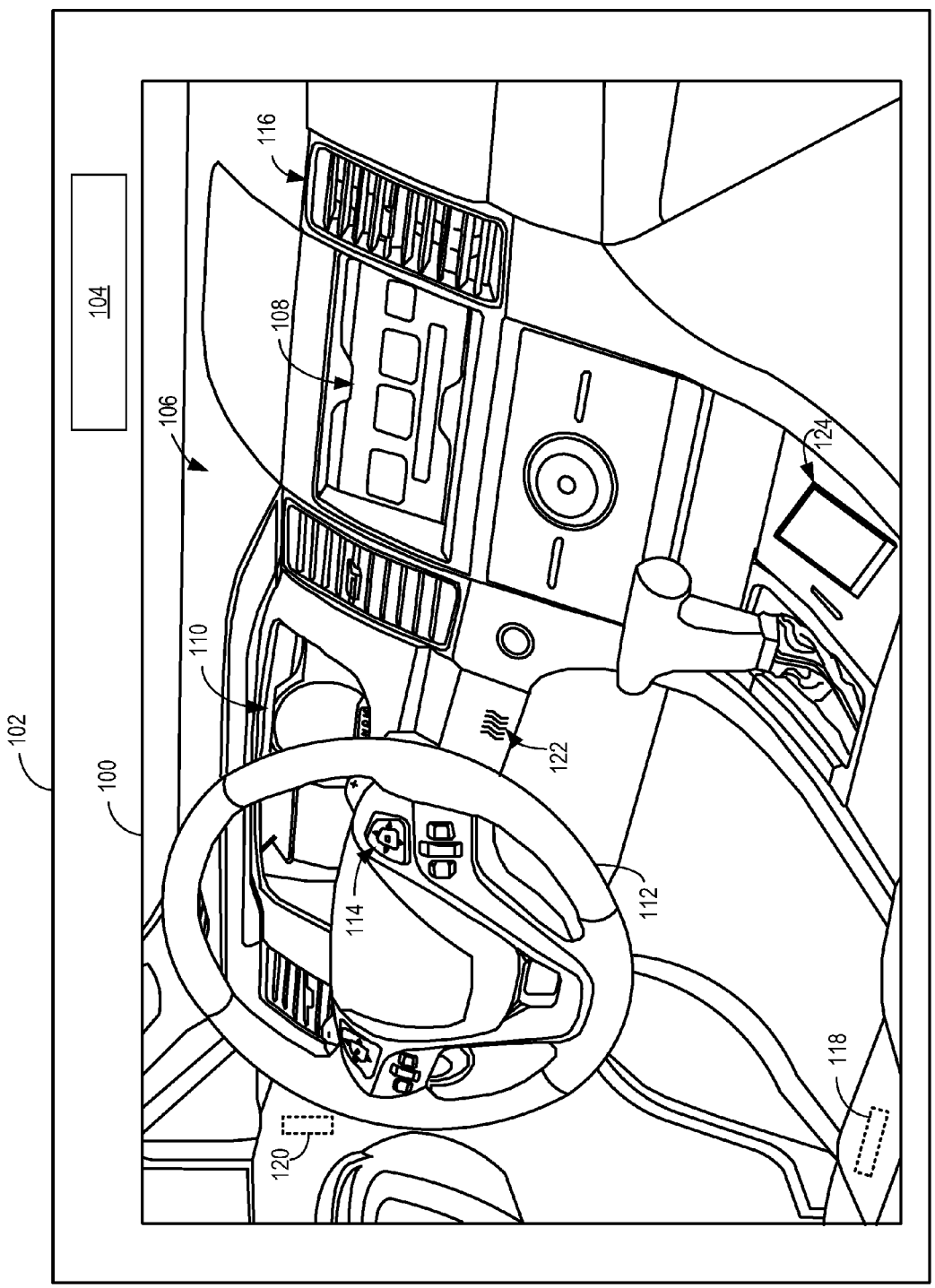
FIG. 1 is a partial view of a vehicle cabin including an in-vehicle computing system and a mobile device, in accordance with one or more embodiments of the present disclosure.

FIG. 1 shows an example partial view of an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

Figure 2:
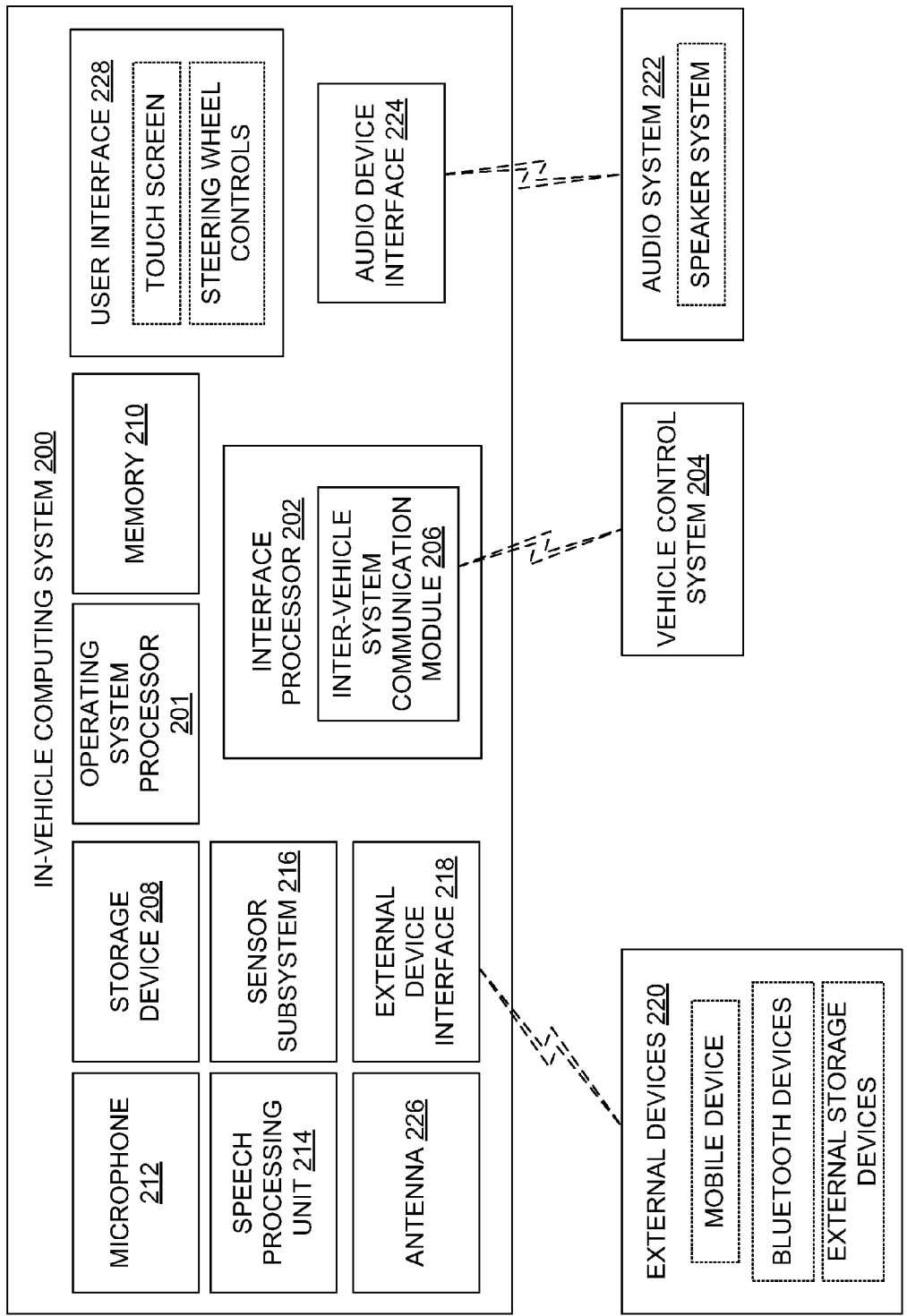
FIG. 2 shows a block diagram of an in-vehicle computing system in accordance with one or more embodiments of the present disclosure.

As shown, an instrument panel 106 may include various displays and controls accessible to a driver of vehicle 102, such as a touch screen 108 of an in-vehicle computing system (e.g., an infotainment system, such as in-vehicle computing system 200 of FIG. 2), an audio system control panel, and an instrument cluster 110. While the example system shown in FIG. 1 includes audio system controls that may be performed via a user interface of an in-vehicle computing system such as touch screen 108 without a separate audio system control panel, in other embodiments, the vehicle may include an audio system control panel, which may include controls for a conventional vehicle audio system such as a radio, compact disc player, MP3 player, etc. Instrument cluster 110 may include various gauges such as a fuel gauge, tachometer, speedometer, and odometer, as well as indicators and warning lights. A steering wheel 112 may project from the instrument panel below instrument cluster 110. Optionally, steering wheel 112 may include controls 114 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, etc. In one or more embodiments, control of in-vehicle climate via climate control system vents 116 may be performed using touch screen 108 and thus no separate climate control interface may be included in instrument panel 106. In alternative embodiments, however, a separate climate control interface may be provided.

The cabin 100 may include one or more sensors for detecting the presence of a user. For example, the cabin 100 may include one or more seat-mounted pressure sensors 118 configured to measure the pressure applied to the seat. The cabin 100 may include one or more door sensors 120 configured to monitor door activity, such as the opening and/or closing of the door, the locking of the door, the operation of a window of the door, and/or any other suitable door activity event. A humidity sensor 122 may be included to measure the humidity content of the cabin. It is to be understood that the placement of the sensors illustrated in FIG. 1 is exemplary, and one or more additional sensors may be positioned in any suitable location of the vehicle. The cabin 100 may also include one or more user objects, such as mobile device 124, that are stored in the vehicle before, during, and/or after a travelling.

FIG. 2 shows a block diagram of an in-vehicle computing system 200. In-vehicle computing system 200 may include one or more processors including an operating system processor 201 and an interface processor 202. Operating system processor 201 may execute an operating system on the in-vehicle computing system, and control input/output, display, playback, and other operations of the in-vehicle computing system. Interface processor 202 may interface with a vehicle control system 204 via an inter-vehicle system communication module 206.

Inter-vehicle system communication module 206 may output data to other vehicle components and systems and receive data input from other vehicle components and systems, e.g. by way of vehicle control system 204. When outputting data, inter-vehicle system communication module 206 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors), digital signals such as vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle from the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 201 and 202 in non-volatile form. The storage device 208 may store application data to enable the in-vehicle computing system 200 to run an application for connecting to and/or pairing with a mobile device to provide an alert to a user to retrieve the mobile device when the user is exiting the vehicle. In-vehicle computing system 200 may further include a volatile memory 210. Volatile memory 210 may be random access memory (RAM).

A microphone 212 may be included in the in-vehicle computing system 200 to receive voice commands from a user and/or to measure ambient noise in the vehicle, and a speech processing unit 214 may process the received voice commands. One or more additional sensors may be included in a sensor subsystem 216 of the in-vehicle computing system 200. For example, the sensor subsystem 216 may include a camera, such as a rear view camera for assisting a user in parking the vehicle.

Sensor subsystem 216 of in-vehicle computing system 200 may communicate with and receive inputs from various vehicle sensors and may further receive user inputs. For example, the inputs received by sensor subsystem 216 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 216 alone, other sensors may communicate with both sensor subsystem 216 and vehicle control system 204, or may communicate with sensor subsystem 216 indirectly via vehicle control system 204.

External device interface 218 of in-vehicle computing system 200 may communicate with one or more external devices 220 including a mobile device such as a mobile phone (e.g., via a Bluetooth connection) or another Bluetooth-enabled device. Other external devices may communicate with in-vehicle computing system 200 either wirelessly or via connectors without departing from the scope of this disclosure. For example, external devices 220 may communicate with the in-vehicle computing system 200 through the external device interface 218 via a network, a universal serial bus (USB) connection, a direct wired connection, and/or a direct wireless connection.

In-vehicle computing system 200 may be connected to one or more acoustic reproduction devices such as a vehicle audio system including electromagnetic transducers such as speakers via an audio device interface 224. The vehicle audio system 222 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

As shown, in-vehicle computing system 200 may include an antenna 226. Antenna 226 is shown as a single antenna, but may comprise one or more antennas in some embodiments. The in-vehicle computing system may obtain broadband wireless internet access via antenna 226, and may further receive broadcast signals such as radio, television, weather, traffic, and the like. The in-vehicle computing system may receive positioning signals such as GPS signals via one or more antennas 226. The in-vehicle computing system may also receive wireless commands via RF such as via antenna(s) 226 or via infrared or other means through appropriate receiving devices.

One or more elements of the in-vehicle computing system 200 may be controlled by a user interface 228. User interface 228 may include a graphical user interface presented on a touch screen, such as touch screen 108 of FIG. 1, and/or user-actuated buttons, switches, knobs, sliders, etc. For example, user-actuated elements may include steering wheel controls, door and/or window controls, instrument panel controls, and the like. In some embodiments, a user may provide input to the user interface 228 in order to interact with one or more applications of the in-vehicle computing system 200.

Figure 3:
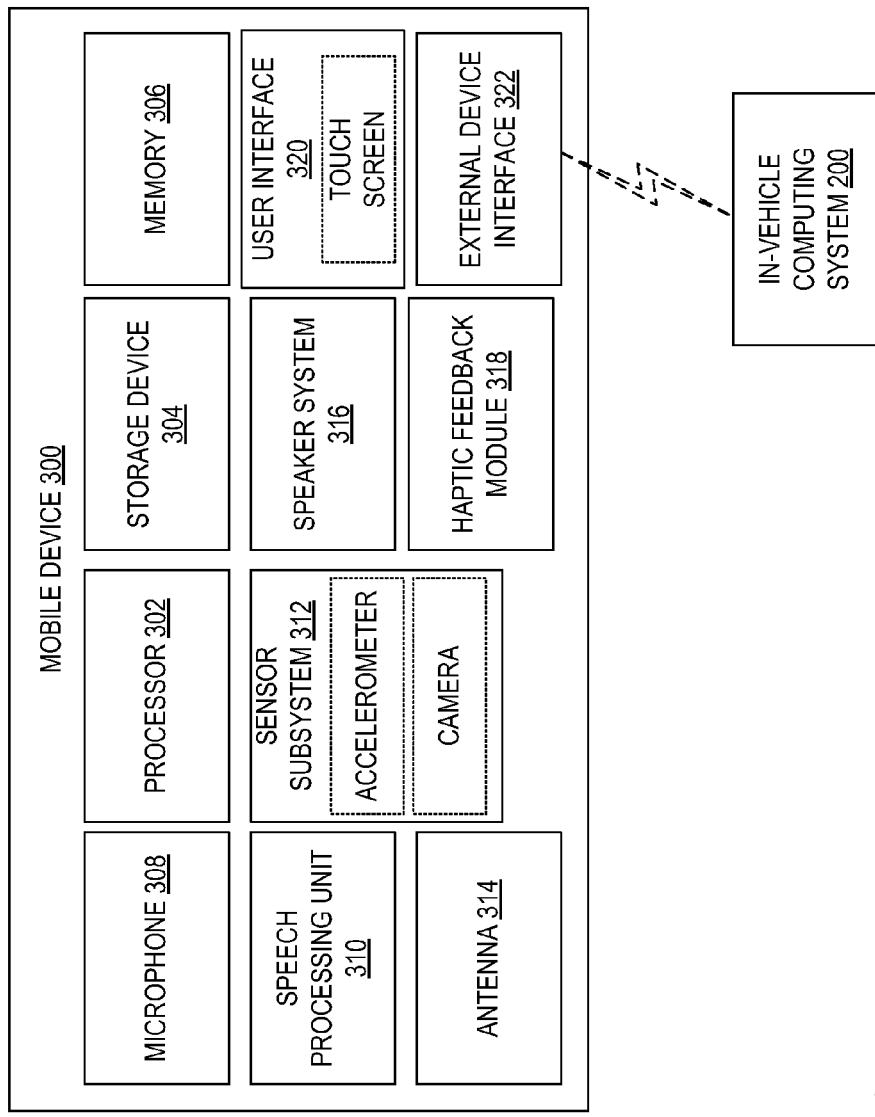
FIG. 3 shows a block diagram of a mobile device in accordance with one or more embodiments of the present disclosure.

FIG. 3 shows a block diagram of a mobile device 300 that may be placed in a vehicle and remain in the vehicle after a user has exited the vehicle. The mobile device 300 may be any suitable mobile device, including but not limited to a mobile phone (e.g., a smart phone), a tablet computer, a laptop computer, a fob, such as a key fob, and/or another suitable mobile device. Similar to the in-vehicle computing system 200, the mobile device may include one or more processors 302 for executing instructions stored on a storage device 304 (e.g., non-volatile memory) to perform one or more actions related to alerting a user of the presence of a mobile device in a vehicle as described below. Mobile device 300 may further include a volatile memory 306. Volatile memory 306 may be random access memory (RAM). The storage device 304 may store application data to enable the mobile device 300 to run an application for connecting to and/or pairing with the in-vehicle computing system to provide an alert to a user to retrieve the mobile device when the user is exiting the vehicle.

A microphone 308 may be included in the mobile device 300 to receive voice commands from a user and/or to measure ambient noise in the vehicle, and a speech processing unit 310 may process the received voice commands. One or more additional sensors may be included in a sensor subsystem 312 of the mobile device 300. For example, the sensor subsystem 312 may include a camera, an accelerometer, and/or any other suitable sensor.

As shown, the mobile device 300 may include an antenna 314. Antenna 314 is shown as a single antenna, but may comprise one or more antennas in some embodiments. The mobile device 300 may obtain broadband wireless internet access via antenna 314 over a cellular or other wireless network, and may further receive broadcast signals such as radio, television, weather, traffic, and the like. The mobile device 300 may also receive positioning signals such as GPS signals via one or more antennas 314. The mobile device 300 may receive wireless commands via RF such as via antenna(s) 314 or via infrared or other means through appropriate receiving devices.

The mobile device 300 may include one or more output devices, including speaker system 316 for providing audio output (e.g., an audible alert) and a haptic feedback module 318 for providing tactile output (e.g., a tactile alert) via a vibration device. A user may control and/or interact with the mobile device via a user interface 320. For example, user interface 320 may include a touch-sensitive display device for displaying a graphical user interface. User interface 320 may also include one or more user-actuated elements for controlling the mobile device 300. The user interface 320 may be utilized to display a visible alert to a user and/or to present one or more user controls for dismissing the alert and/or acquiring more information about the alert.

The mobile device may include an external device interface 322 for communicating with one or more external devices, such as in-vehicle computing system 200 of FIG. 2. The mobile device 300 may communicate with external devices such as in-vehicle computing system 200 either wirelessly or via connectors of the external device interface 322 without departing from the scope of this disclosure. For example, the mobile device 300 may communicate with the in-vehicle computing system 200 through the external device interface 322 via a network, a universal serial bus (USB) connection or other direct wired connection, and/or a direct wireless connection.

Figure 4:
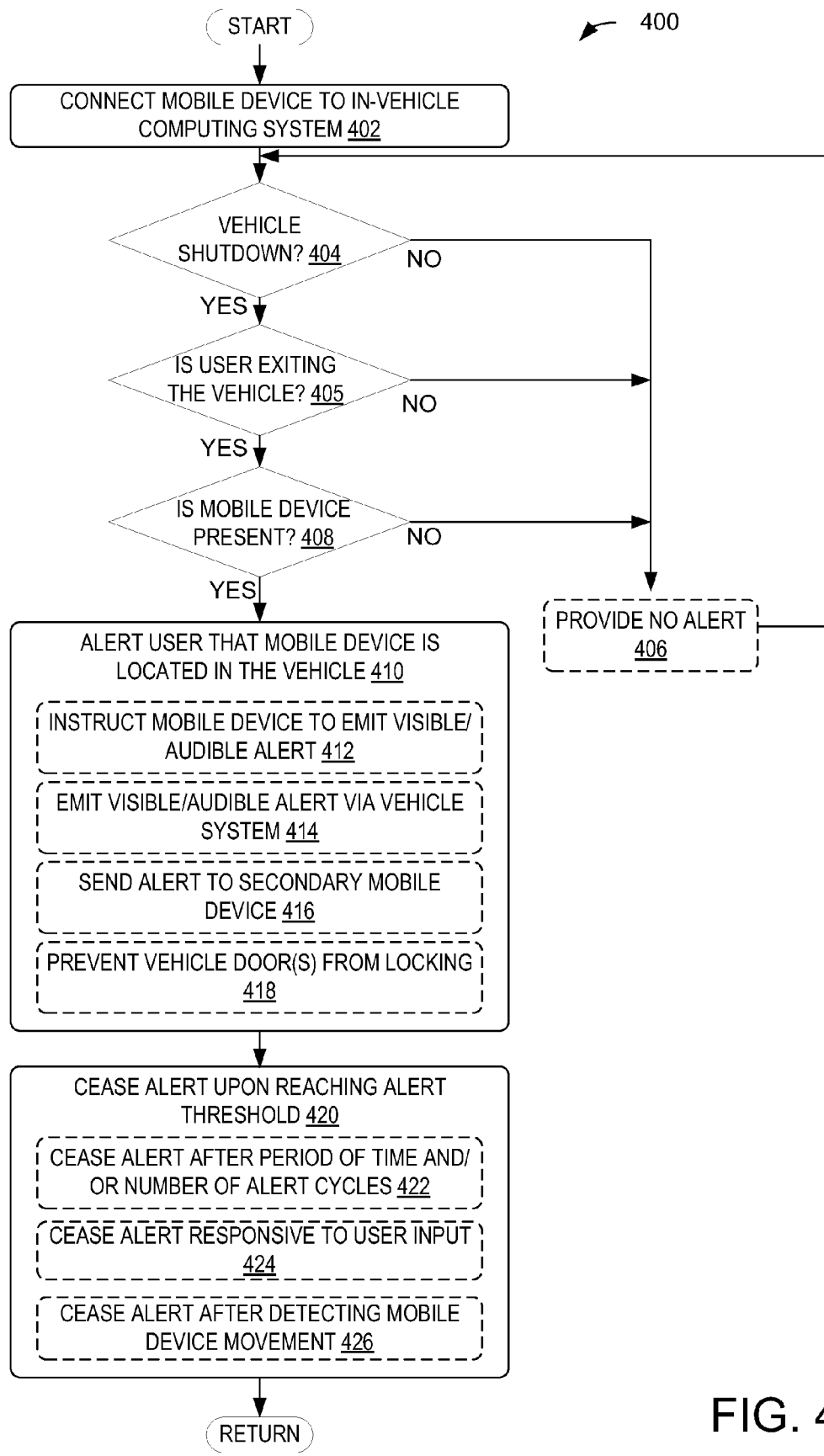
FIG. 4 is a flow chart for a method of alerting a user of the presence of a mobile device in a vehicle in accordance with one or more embodiments of the present disclosure.

FIG. 4 is a flow chart of a method 400 for alerting a user of the presence of a mobile device in a vehicle after the user has exited the vehicle. The method 400 may be performed by any suitable in-vehicle computing system, such as in-vehicle computing system 200 of FIG. 2. At 402, the method 400 includes connecting a mobile device to an in-vehicle computing system, such as in-vehicle computing system 200 of FIG. 2. The mobile device may be connected to the in-vehicle computing system via any suitable wireless and/or wired communication configuration, including but not limited to BLUETOOTH, WI-FI, Universal Serial Bus (USB), Near-Field Communication (NFC), etc. Communication protocols that rely upon proximity between systems that are to be connected may be utilized in order to indicate relative location of the systems. The connection between the mobile device and the in-vehicle computing system at 402 may be performed automatically and/or via an application running on the mobile device and/or the in-vehicle computing system. For example, a user may start an application on the mobile device and locate the in-vehicle computing system in order to complete a pairing between the two systems. The user may instruct the application to save the pairing in order to allow the application to perform an automatic pairing of the two systems when the mobile device is within communication range of the in-vehicle computing system.

While the mobile device is connected to the in-vehicle computing system, the in-vehicle computing system determines whether a vehicle shutdown has occurred at 404. For example, a vehicle shut down may occur separately from (e.g., after) an engine shut down and include shutting down one or more systems of the vehicle in addition to the engine of the vehicle. If a vehicle shutdown has occurred, the presence of the user may be determined in order to identify whether the user is exiting the vehicle at 405. Examples of determining whether a user is exiting the vehicle is described in more detail below with respect to FIG. 5. In one or more embodiments, the in-vehicle computing system may have been previously connected with the mobile device. For example, during vehicle operation prior to the shut down (but after any previous shut downs), the in-vehicle computing system may have been connected with the mobile device and shared data with the device and/or received instructions from the mobile device including music, playlists, etc. The connection, which may be via near-field communication, in and of itself may indicate the location and presence of the mobile device in the vehicle to the in-vehicle computing system. Alternatively, the in-vehicle computing system may receive, via the connection of the in-vehicle computing system with the mobile device, GPS coordinates of the mobile device and compare those to GPS coordinates of the vehicle to identify that the mobile device is in the vehicle. In still another example, during vehicle motion, the in-vehicle computing system may compare GPS position changes of the mobile device, via data received through the connection to the mobile device, with GPS position changes of the vehicle to identify that the mobile device is traveling with (and thus in) the vehicle. It should be appreciated that the connection between the in-vehicle computing system and the mobile device may be initiated by the in-vehicle computing system and/or the mobile device, and can be automatically generated based on whether a previous connection between the in-vehicle computing system and the mobile device has been established and stored in memory of the in-vehicle computing system and/or the mobile device.

In another embodiment, the in-vehicle computing system may connect with the mobile device responsive to the shut down. In this example, the vehicle computer system may have been previously connected with the mobile device, but was not connected at the vehicle shut down. Therefore, the in-vehicle computing system may initiate a connection to the mobile device responsive to the shut down in order to identify a location of the mobile device. Further, as described above, data may be exchanged over the connection, including a GPS location of the mobile device for comparison with GPS location of the vehicle to identify whether the mobile device is in the vehicle. As described herein, the connection between the in-vehicle computing system and the mobile device may be near field, such as Bluetooth, or may be WI-FI, cellular, and/or other connections.

If the user is not determined to be exiting the vehicle, the method 400 may proceed to 406, where no alert is provided. Upon optionally providing no alert to the user, the method 400 returns to 404 to monitor for the absence of the user. Conversely, if the user is determined to be absent, the method 400 proceeds to 408 to determine whether the mobile device is present. Examples of determining whether a mobile device is present are described in more detail below with respect to FIG. 6. If the mobile device is not determined to be present at 408, the method 400 proceeds to 406 to optionally provide no alert before returning to monitor for the presence of the user at 404.

If the mobile device is determined to be present at 408, the method 400 proceeds to 410 to alert the user that the mobile device is located in the vehicle. Providing the alert may optionally include instructing the mobile device to emit a visible and/or audible alert, as indicated at 412. For example, the in-vehicle system may send an instruction to the mobile device via an external device interface to display an alert on a display device of the mobile device and/or generate an audible alert via one or more speakers of the mobile device. A displayed alert may include any suitable displayed image, pattern, message, etc. In some embodiments, the displayed alert may include a graphical user interface to enable a user to interact with the alert. For example, the graphical user interface may enable a user to view more information about the alert, to configure the alert, to stop the alert, and/or to perform any other action related to the alert. An audible alert may include any suitable sound generation, including but not limited to a pattern of tones, a continuous or pulsed system beep, a particular message output in a language associated with a user of the mobile device, and/or any combination of sounds output by a speaker of the mobile device and/or an audio output device connected to the mobile device (e.g., headphones, external speakers, etc.). The audible alert may be specified by the in-vehicle computing system and/or may utilize audio patterns or songs stored on the mobile device. In some embodiments, the visible and/or audible alert may include or be accompanied by a tactile alert, such as a vibration.

The alert may optionally include a visible and/or audible alert via the vehicle system, as indicated at 414. For example, a display of the in-vehicle computing system and/or speakers of the vehicle may be instructed to provide one or more of the alerts described above. A visible/audible alert may additionally or alternatively be sent to a secondary mobile device, as indicated at 416. For example, a secondary mobile device may be connected to the in-vehicle computing system via a direct wireless or wired connection, via a primary mobile device (e.g., the mobile device that is determined to be present at 408), and/or via a network. The secondary mobile device may be selected by the user and/or automatically selected based on the connectivity and/or proximity of the secondary mobile device to the in-vehicle computing system. For example, the secondary mobile device may be a second mobile device of the user or a mobile device belonging to a second user, such as a family member of the user and/or passenger of the vehicle. In some embodiments, the secondary mobile device may include a key fob for the vehicle and/or attachable to a key ring holding a key for the vehicle. As the user may be less likely to leave keys in the vehicle than the mobile device, the alert instruction may be sent to the key fob to generate a visible, audible, and/or tactile alert for the user.

In some embodiments, the alert may include altering a function of one or more vehicle systems via an inter-vehicle communication module to provide an indication to a user that a circumstance exists that may warrant the attention of the user. For example, the alert may include preventing one or more doors from locking, as indicated at 418. By preventing the door(s) from locking responsive to an instruction from the user, the user may pause before leaving the vehicle in order to determine the cause of the lock prevention, thereby allowing more time to recognize the presence of the mobile device in the vehicle. In some embodiments, the vehicle doors may be permitted to be locked via user input after a threshold number of attempts to lock the doors is reached. In additional or alternative embodiments, preventing the vehicle door(s) from locking may include preventing the doors from locking temporarily, and automatically locking the doors after a threshold period of time has elapsed since the user request to lock the doors and/or another reference point in time.

The type of alert used may be selected and/or configured by a user and/or the in-vehicle computing system. For example, the type of alert used may selected based on a historically successful alert (e.g., an alert that achieved user response in past occurrences) or selected from a list of alerts upon an initial connection between the mobile device and the in-vehicle computing system. In some examples, a volume of the alert may be increased when the in-vehicle computing system and/or mobile device detects an increased level of ambient noise in or around the vehicle. In additional or alternative examples, an audible and/or tactile alert may be selected in high ambient light conditions, as the high ambient light may result in difficulty in perceiving an alert displayed on a display device. It is to be understood that multiple alerts may be used in any combination simultaneously and/or individually.

The method 400 may include ceasing the alert in order to provide fewer or no alerts upon reaching an alert threshold, as indicated at 420. The alert threshold may be selected and/or configured by a user or automatically selected and/or configured by the in-vehicle computing system. For example, as described above with respect to the type of alert, the alert threshold may selected based on historical data (e.g., the average amount of time that elapses before a user response in prior successful alert events) or selected from a list of alert thresholds upon an initial connection between the mobile device and the in-vehicle computing system. The in-vehicle computing system may alter the alert threshold over time based on user behavior responsive to the alert and/or conditions during the time of the alert. In some embodiments, the alert may be ceased after a threshold period of time and/or a threshold number of alert cycles has elapsed since a start of the alert or other reference point, as indicated at 422. For example, an alert cycle may correspond to a subset of a repeating pattern, a single pulse of a pulsed system beep, etc.

The alert threshold may correspond to user response, including detecting a user input as indicated at 424 and/or mobile device movement as indicated at 426. For example, a user may acknowledge an alert by selecting a user interface element of the in-vehicle computing system and/or the mobile device, by actuating an element relating to a vehicle system (e.g., inserting and/or turning a key in an ignition or door, pressing a key fob button, actuating a steering wheel, door, instrument panel, and/or console button, switch, knob, and/or slider, etc.), by moving the mobile device, and/or by performing any suitable action indicating that the alert is acknowledged. The acknowledgement may include performing one or more of the determinations performed at 408, and described with respect to FIG. 6, to determine whether the mobile device is present. After ceasing the alert, the alert may be triggered again responsive to a state change of the vehicle, the user presence, and/or the mobile device presence, based upon the manner in which the alert is ceased. For example, the alert may be triggered again after the user is detected to have returned and exited the vehicle again, and/or after the mobile device is detected to have returned and remained present during a subsequent user exit.

Figure 5:
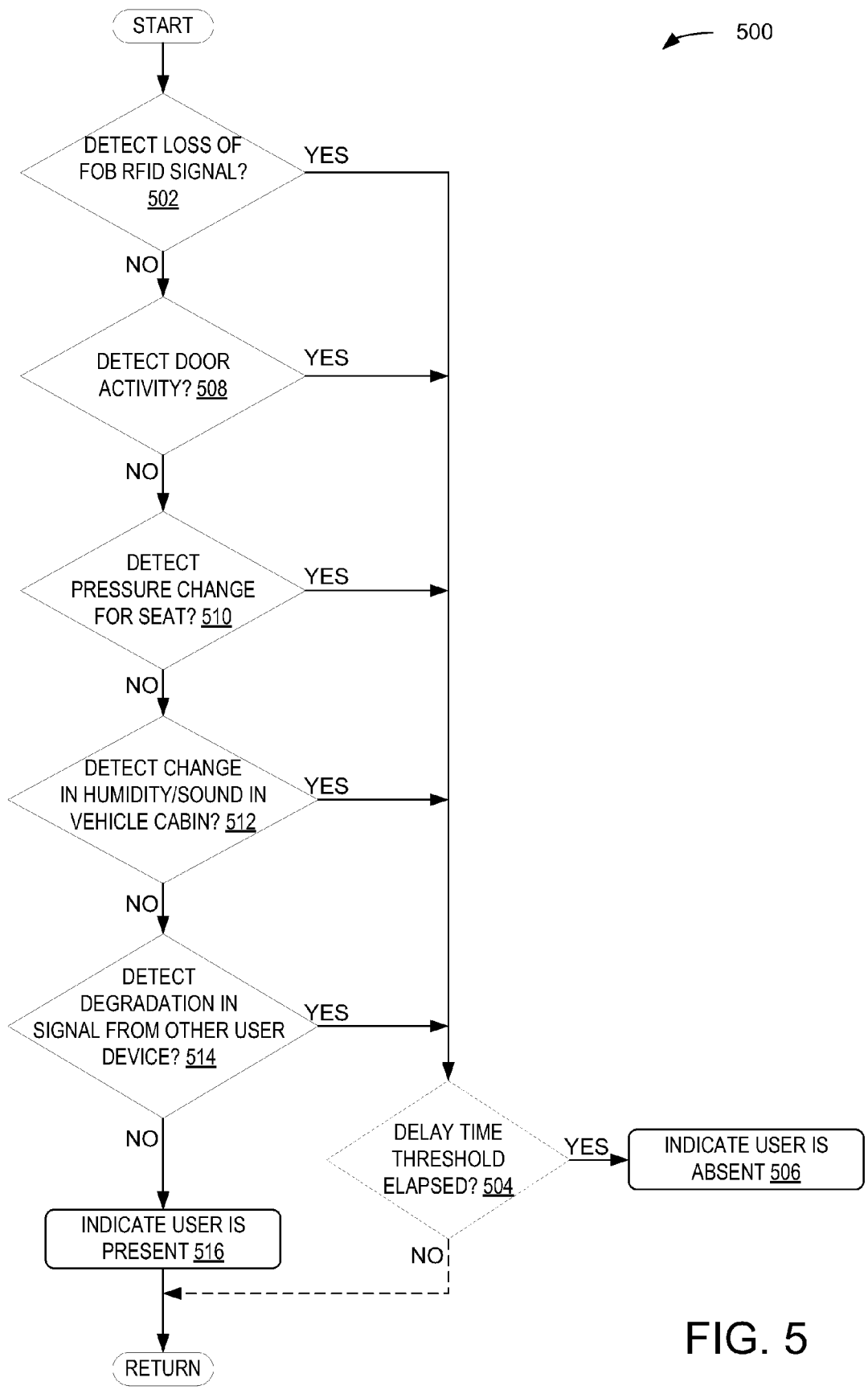
FIG. 5 is a flow chart for a method of determining a presence of a user in a vehicle in accordance with one or more embodiments of the present disclosure.

As described briefly above, the in-vehicle computing system may determine whether a user is exiting a vehicle in order to determine whether an alert may be performed. FIG. 5 is a flow chart illustrating a method 500 for determining if a user is present in the vehicle. For example, the method 500 may be performed at step 405 of FIG. 4 to determine if the user is exiting the vehicle. In some embodiments, the method 500 may be performed continuously in order to monitor for changes in a presence of the user. The method 500 may be performed by a suitable computing system, such as in-vehicle computing system 200 of FIG. 2, mobile device 300 of FIG. 3, and/or an external computing device connected to the in-vehicle computing system via a network.

As described with regard to FIG. 4, the method 500 may be carried out during and/or responsive to a determination that the vehicle is or has been shut down. If the vehicle is determined to be shut down, the method 500 proceeds to 502 to determine if a fob RFID signal (that was previously detected and identified as authorized to operate the vehicle) is no longer present. If so, it may be determined that a user, such as the vehicle operator, has left the vehicle and the method 500 proceeds to 506 to indicate that the user is absent or otherwise exiting the vehicle.

In one or more embodiments, at 504 the method determines if a delay time threshold has elapsed. If the delay time threshold has elapsed, and/or if no delay time threshold is utilized, the method 500 proceeds to 506 to indicate that the user is absent or otherwise exiting the vehicle. For example, a delay timer for the delay time threshold may be configured to start immediately upon vehicle shut down and/or upon detecting one or more other conditions (e.g., the conditions described in the remaining steps of method 500) indicating a user exit from the vehicle. In embodiments that include a delay time threshold, the method 500 may return to continue monitoring activity related to user presence while the delay timer is running.

If the answer to 502 is NO, the method 500 may proceed to 508 to determine whether door activity is detected. For example, detecting door activity may include detecting door opening and/or closing, door locking and/or unlocking requests, door window operation, and/or any other vehicle door-related activity indicating that a user may exit, intends to exit, and/or has exited the vehicle. If door activity is detected, the method 500 may optionally proceed to 504 to determine if the delay time threshold has elapsed, before selectively proceeding to 506 to indicate that the user is absent or otherwise exiting the vehicle. If door activity is not detected at 508, the method 500 may proceed to 510 to determine if a pressure change is detected via a seat sensor. For example, the seat sensor may indicate that a pressure decreases more than a pressure change threshold when the user exits the seat. Accordingly, a pressure decrease that is greater than the pressure change threshold may result in a change being detected at 510, while any pressure increase or a pressure decrease that is smaller than the pressure change threshold may result in a change not being detected at 510. In some embodiments, the pressure change threshold may be determined based upon an average amount of pressure measured by the seat sensor when a user is seated in comparison to an average amount of pressure measured by the seat sensor when a user is absent. The pressure change threshold may be predetermined or updated over time based on user input and/or historical measurements tracked by the in-vehicle computing system and/or the vehicle control system.

Responsive to detecting pressure change at 510, the method 500 may optionally proceed to 504 to determine if the delay time threshold has elapsed, before selectively proceeding to 506 to indicate that the user is absent or otherwise exiting the vehicle. Responsive to not detecting pressure change at 510, the method 500 may proceed to 512 to determine whether a change in humidity and/or sound is detected in the vehicle cabin. As users leave a vehicle, the humidity and/or sound in the vehicle cabin may decrease. Therefore, one or more sensors of the vehicle and/or mobile device may measure humidity and/or sound to determine if a humidity/sound change threshold has been exceeded indicating a change in the number of users in the vehicle. The humidity/sound change threshold may be predetermined or updated over time based on user input and/or historical measurements tracked by the in-vehicle computing system and/or the vehicle control system. If the humidity/sound change threshold has been exceeded at 512, the method 500 may optionally proceed to 504 to determine if the delay time threshold has elapsed, before selectively proceeding to 506 to indicate that the user is absent or otherwise exiting the vehicle. If the humidity/sound change threshold has not been exceeded at 512, the method 500 may proceed to 514 to determine whether a degradation in a signal from another user device is detected.

In embodiments including the connection of two or more mobile devices to the in-vehicle computing system, the presence or absence of one mobile device compared to another mobile device(s) may be used to determine whether a user is exiting the vehicle. For example, if a user takes one mobile device, but leaves the other, the signal from the first mobile device to the in-vehicle computing device may degrade as the user exits the vehicle while the signal from the second mobile device remains unchanged. Accordingly, the degradation may signal the exit of the user, causing the method 500 to optionally proceed to 504 to determine if the delay time threshold has elapsed, before selectively proceeding to 506 to indicate that the user is absent or otherwise exiting the vehicle. Conversely, if none of the steps 502 or 508 through 514 are determined to be true, the method 500 proceeds to 516 to indicate that the user is present and/or otherwise not intending to leave the vehicle. The indication of the presence of the user may be utilized at step 405 of method 400. For example, an indication that the user is present may be utilized to determine that the user is not exiting the vehicle at 405, while an indication that the user is present may be utilized to determine that the user is exiting the vehicle at 405.

It is to be understood that the method 500 may include additional or alternative steps to those illustrated in FIG. 5, and/or may omit one or more of the steps. The steps of method 500 may be rearranged in any suitable manner, and some of the steps may be performed substantially simultaneously with other steps. For example, all or multiple determinations may be performed before indicating that the user is present or absent. In such examples, the user may be determined as absent responsive to a threshold number of conditions being determined as detected in steps 502 and 508 through 514. In some embodiments, the user may be indicated as present if any one of the conditions determined in steps 502 and 508 through 514 are not detected, while in other embodiments, the user may be indicated as absent if any one of the conditions determined in steps 502 and 508 through 514 are detected.

Figure 6:
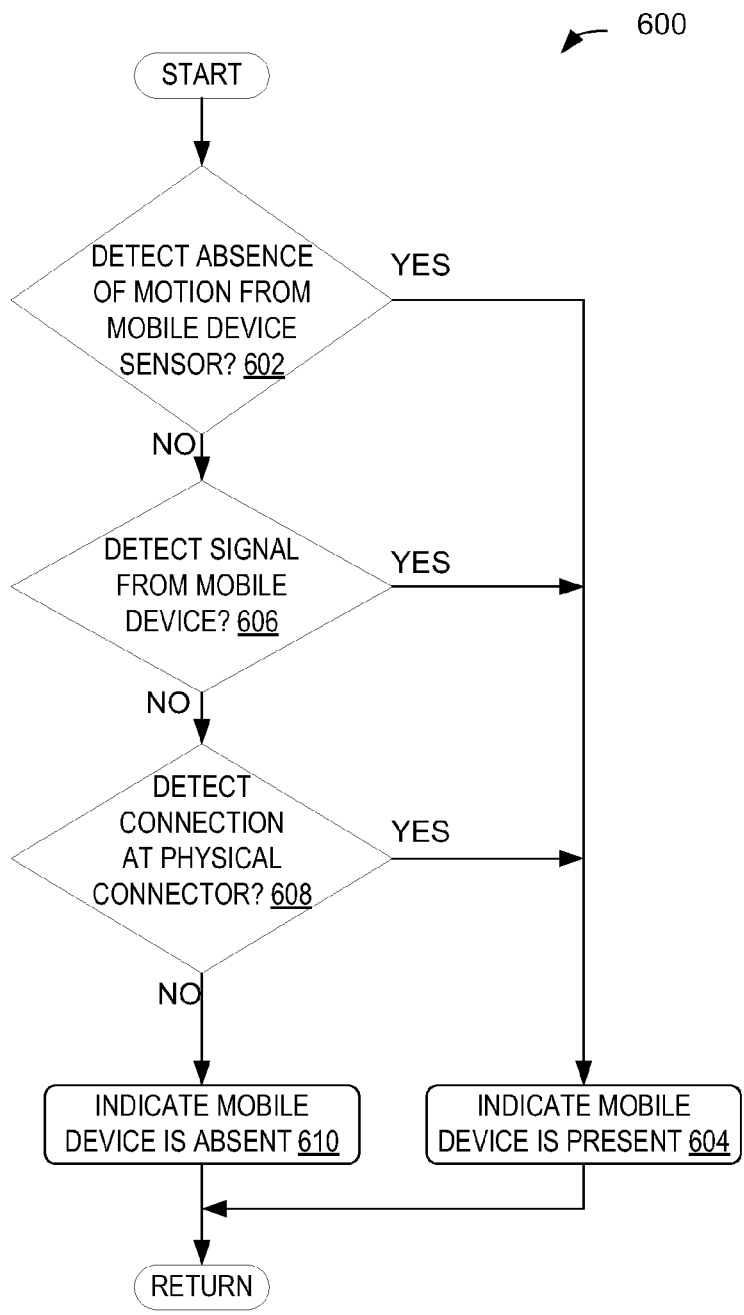
FIG. 6 is a flow chart for a method of determining a presence of a mobile device in a vehicle in accordance with one or more embodiments of the present disclosure.

Turning now to FIG. 6, a flow chart for a method 600 for determining the presence of a mobile device in a vehicle is shown. The method 600 may be performed by any suitable computing system, such as in-vehicle computing system 200 of FIG. 2, mobile device 300 of FIG. 3, and/or an external computing device connected to the in-vehicle computing system via a network. For example, the method 600 may be performed at step 408 of FIG. 4 to determine if the mobile device is present. In some embodiments, the method 600 may be performed continuously in order to monitor for changes in a presence of the mobile device.

The method 600 includes determining whether an absence of motion from a mobile device sensor is detected, as indicated at 602. For example, motion from an accelerometer of a mobile device exceeding a threshold may indicate that the mobile device has been picked up or otherwise removed from the vehicle, while motion from the accelerometer of the mobile device under the threshold may indicate that the mobile device is stationary in the vehicle. In some embodiments, the threshold may be relative to a second mobile device, such that motion below the threshold corresponds to a substantial difference between motion measured by the first and second mobile devices. Responsive to detecting motion that does not exceed the threshold, the method 604 continues to 604 to indicate that the mobile device is present. If motion is exceeding the threshold detected at 602, the method 600 continues to 606 to determine if a signal is detected from the mobile device. For example, the in-vehicle computing system may determine whether a signal is received from the mobile device and/or monitor to determine whether such a signal is degraded. A loss and/or degradation of a signal from a mobile device may indicate that the mobile device has been moved or is moving away from the vehicle. Accordingly, if a signal is detected from the mobile device and/or a signal quality remains unchanged at 606, the method 600 proceeds to 604 to indicate that the mobile device is present. Conversely, if a signal is not detected from the mobile device and/or a signal quality from the mobile device is determined to have changed at 606, the method proceeds to 608 to determine if a connection at a physical connector is detected. For example, a connection of a mobile device to a physical, wired connector may indicate that the mobile device is present. Accordingly, if the mobile device is connected to the physical connector at 608, the method 600 proceeds to 604 to indicate that the mobile device is present. Responsive to detecting that the mobile device is not connected and/or changes a connection state to become disconnected at 608, the method 600 continues to 610 to indicate that the mobile device is absent.

It is to be understood that the method 600 may include additional or alternative steps to those illustrated in FIG. 6, and/or may omit one or more of the steps. The steps of method 600 may be rearranged in any suitable manner, and some of the steps may be performed substantially simultaneously with other steps. For example, all or multiple determinations may be performed before indicating that the mobile device is present or absent. In such examples, the mobile device may be determined as absent responsive to a threshold number of conditions being determined as detected in steps 602, 606, and 608. In some embodiments, the mobile device may be indicated as present if any one of the conditions determined in steps 602, 606, and 608 are detected, while in other embodiments, the mobile device may be indicated as absent if any one of the conditions determined in steps 602, 606, and 608 are not detected.

Figure 7:
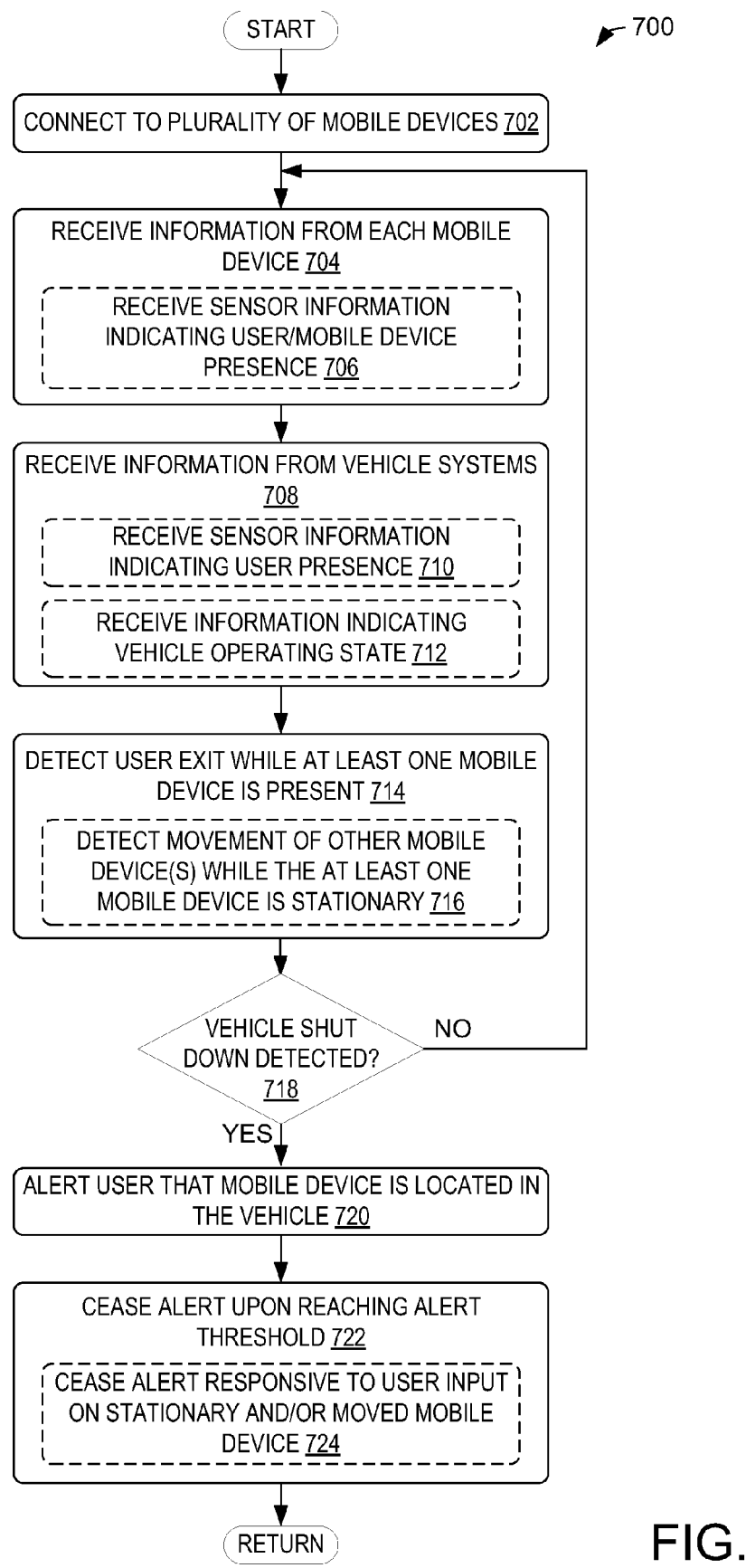
FIG. 7 is a flow chart for a method of alerting a user of the presence of at least one mobile device of a plurality of mobile devices in a vehicle in accordance with one or more embodiments of the present disclosure.

FIG. 7 shows a flow chart for a method 700 of providing an alert to a user of a vehicle in embodiments including multiple mobile devices. The method 700 may be performed by any suitable in-vehicle computing system, such as in-vehicle computing system 200 of FIG. 2. At 702, the method 700 includes connecting a plurality of mobile device to the in-vehicle computing system. For example, each mobile device may be paired to the in-vehicle computing system using an application running on each mobile device. The method 700 includes receiving information from each mobile device, as indicated at 704. The information may include sensor information indicating a user and/or mobile device presence, as indicated at 706. For example, each mobile device may include one or more sensors for measuring ambient conditions, motion, user input, and the like, and the measurements may be sent to the in-vehicle computing system for processing. In some embodiments, the mobile devices may process sensor information to determine user and/or mobile device presence and send the processed sensor information to the in-vehicle computing system.

At 708, the method 700 includes receiving information from one or more vehicle systems, received via an inter-vehicle communication module in some embodiments. As indicated at 710, the information may include sensor information indicating user presence, such as temperature and/or humidity measurements, ambient sound levels, air conditioning output, audio system usage, pressure measurements from a pressure sensor of a seat of the vehicle, door activity from a door sensor, user input directed to the in-vehicle computing system user interface, and/or any other suitable information indicating user presence in the vehicle. As indicated at 712, the information may include information indicating a vehicle operating state, such as an ignition state, power state, engine speed, transmission state and/or gear setting, braking information, and/or any other suitable vehicle operating state to indicate a vehicle shut down condition, a presence of a user, and/or an intent of a user to exit the vehicle.

The method 700 includes detecting a user exit while at least one mobile device is present, as indicated at 714. For example, the in-vehicle computing system may utilize information received from the mobile device and/or the vehicle systems at 704 and 708, respectively, to determine a user exit and mobile device presence. As indicated at 716, the detection may include detecting movement of another mobile device or devices while the at least one mobile device is stationary. In this way, the movement of other mobile devices may indicate that the user may intend to exit the vehicle while inadvertently leaving the at least one mobile device behind. At 718, the method 700 includes determining if a vehicle shut down is detected. For example, the method 700 may determine vehicle shut down by analyzing information received from the one or more vehicle systems at 708. The vehicle shut down condition may indicate that the user has not left the vehicle or is planning to leave the vehicle for a short amount of time and does not intend to remove the mobile device. Accordingly, if vehicle shut down is not detected, the method 700 may return to continue receiving and monitoring information from the mobile device(s) and vehicle systems.

Responsive to detecting vehicle shut down at 718, the method 700 proceeds to 720 to alert the user that the mobile device is located in the vehicle. As indicated at 722, the alert is ceased by emitting fewer or no alerts upon reaching an alert threshold. For example, the alert may be ceased responsive to user input on the stationary and/or the moved mobile device(s), as indicated at 724. It is to be understood that the detection of user presence and/or mobile device presence, the alert, and the alert threshold may correspond to the respective presence and alert conditions described above with respect to FIG. 4.

Figure 8:
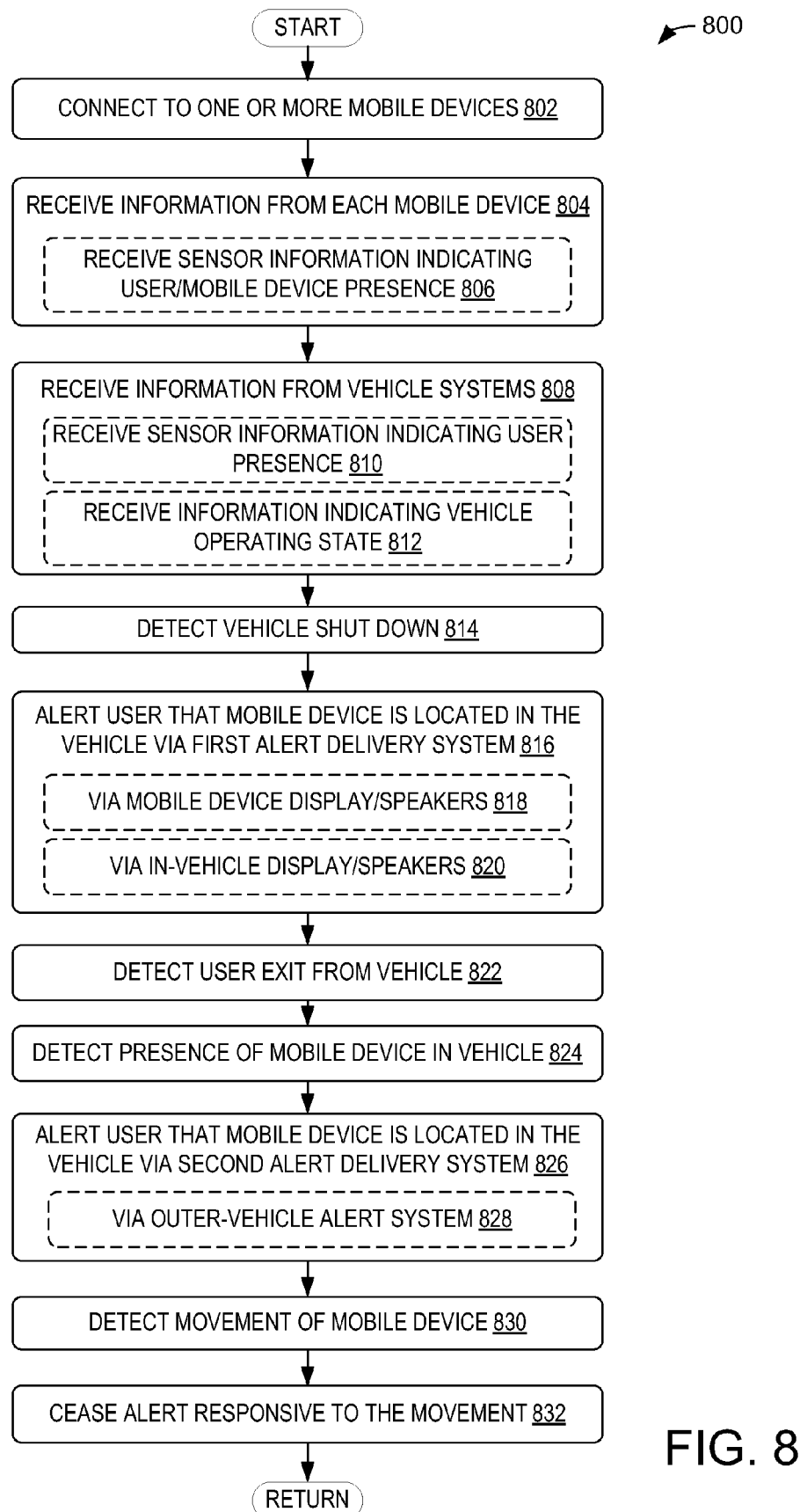
FIG. 8 is a flow chart for a method of alerting a user of the presence of a mobile device in a vehicle using different alert delivery systems in accordance with one or more embodiments of the present disclosure.

FIG. 8 illustrates a flow chart of a method 800 for providing alerts based on a responsiveness and/or a location of the user. The method 800 may be performed by any suitable in-vehicle computing system, such as in-vehicle computing system 200 of FIG. 2. The method 800 includes connecting an in-vehicle computing system to one or more mobile device at 802. The method 800 includes receiving information from each mobile device at 804. For example, the in-vehicle computing system may receive sensor information indicating a user and/or mobile device presence, as indicated at 806, in accordance with similar steps performed at 706 of FIG. 7. At 808, the method 800 includes receiving information from vehicle systems. For example, the in-vehicle computing system may receive sensor information indicating user presence, as indicated at 810 and/or vehicle operating state, as indicated at 812, in accordance with similar steps performed at 710 and/or 712 of FIG. 7.

At 814, the method includes detecting a vehicle shut down. Responsive to detecting the vehicle shut down, the in-vehicle computing system alerts the user that the mobile device is located in the vehicle via first alert delivery system, as indicated at 816. The first alert delivery system may include the display and/or speakers of a mobile device, as indicated at 818 and/or a display and/or speakers within a vehicle (e.g., a display of the in-vehicle computing system and/or the speaker system of the vehicle), as indicated at 820. For example, upon detecting vehicle shut down, the user may be determined to be within the vehicle and intending to exit. In order to prevent the user from exiting the vehicle without removing the mobile device, the first alert delivery system may provide the alert from within the vehicle to remind the user of the presence and/or location of the mobile device.

At 822, the method 800 includes detecting a user exit from the vehicle. For example, the user exit may be determined by detecting one or more of the conditions at steps 508 through 514 of FIG. 5. In one example, the method detects that at least two passengers have exited the vehicle. At 824, the method 800 includes detecting the presence of the mobile device in the vehicle. For example, the presence of the mobile device may be determined by detecting one or more of the conditions at 602, 606, and 608 of FIG. 6. Responsive to detecting user exit while the mobile device is present in the vehicle, the method 800 includes alerting the user that the mobile device is located in the vehicle via a second alert delivery system, as indicated at 826. The second alert delivery system may include an outer-vehicle alert system, as indicated at 828. For example, the second alert delivery system may provide alerts to the user by flashing lights on an exterior of the vehicle, outputting audio from a car horn and/or other external speaker of the vehicle, preventing the car from locking and/or responding to user requests, displaying information on a display viewable from outside of the vehicle, sending one or more messages instructing a different mobile device, other than the mobile device determined to be present in the vehicle, to provide an alert, and/or by any other system to provide an alert to the user while the user is outside of the vehicle.

The method 800 may include detecting movement of the mobile device at 830, and in response, ceasing the alert by providing fewer or no alerts at 832. In some embodiments, the alert may be ceased without detecting movement of the mobile device. For example, the alert may be ceased after a threshold time or number of alert cycles has elapsed and/or upon user input acknowledging the alert.

Figure 9:
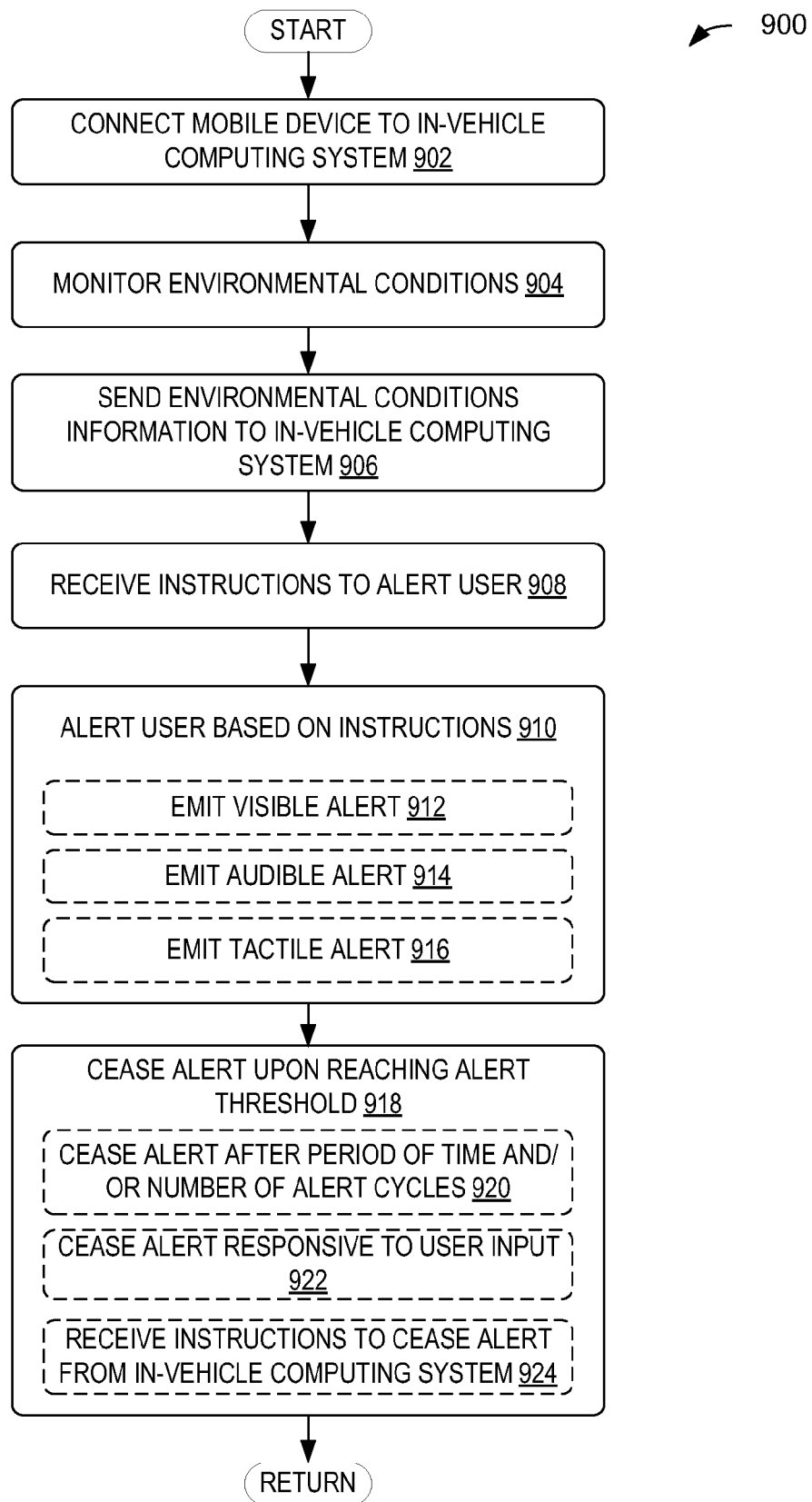
FIG. 9 is a flow chart for a method of alerting a user with a mobile device of the presence of the mobile device in a vehicle in accordance with one or more embodiments of the present disclosure.

FIG. 9 shows a flow chart of a method 900 of alerting a user to the presence of a mobile device in a vehicle. The method 900 may be performed by any suitable mobile device, such as mobile device 300 of FIG. 3. At 902, the method 900 includes connecting the mobile device to an in-vehicle computing system, such as in-vehicle computing system 200 of FIG. 2. For example, the mobile device may be connected to the in-vehicle computing system through an application running on the mobile device. The application may allow access to one or more systems and/or modules of the mobile device by the in-vehicle computing system and enable communication between the mobile device and the in-vehicle computing system. The method 900 includes monitoring environmental conditions, as indicated at 904. For example, environmental conditions, such as ambient light, sound, movement, etc., may be measured by one or more sensors of the mobile device. At 906, the method 900 includes sending the environmental conditions information to the in-vehicle computing system.

The mobile device may receive instructions to alert the user of the presence and/or location of a mobile device at 908. As indicated at 910, the alert may be generated and/or presented to the user based on the instructions received at 908. For example, the mobile device may alert the user that the mobile device is in the vehicle if the mobile device is present in the vehicle, while the mobile device may alert the user that another mobile device is in the vehicle if the mobile device is not present in the vehicle. The instructions may indicate that the mobile device is to emit a visible alert at 912, an audible alert at 914, and/or a tactile alert at 916. The mobile device may cease the alert by providing fewer or no alerts upon reaching an alert threshold, as indicated at 918. For example, the mobile device may cease outputting the alert after a period of time and/or a number of alert cycles, as indicated at 920. The mobile device may cease outputting the alert responsive to user input at the mobile device, as indicated at 922. For example, the mobile device may cease outputting the alert responsive to detecting movement, receiving a user selection at a user interface of the mobile device, etc. In response to receiving the user input, the mobile device may send information to the in-vehicle computing system indicating the user input received and/or that the alert is ceased. As indicated at 924, the mobile device may receive instructions to cease the alert from the in-vehicle computing system and cease the alert responsive to the instructions.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system and/or mobile device described with reference to FIGS. 1 and 2. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and subcombinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
    identifying, via an in-vehicle computing system of a vehicle, presence of a mobile device;
    providing a first alert responsive to a first condition that occurs prior to detecting a user exiting the vehicle, the first condition including detecting a vehicle shutdown when the presence of the mobile device has been identified; and
    after providing the first alert, providing a second alert responsive to at least a second condition that is different from the first condition, the second condition including detecting the user exiting the vehicle when the mobile device is still located in the vehicle;
    wherein the first alert is provided by a first alert delivery system, and the second alert is provided by a second alert delivery system, the first alert delivery system being different from the second alert delivery system.

2. The method of claim 1, wherein the second alert is provided responsive to determining that the vehicle is shut down, and wherein the in-vehicle computing system was one or more of previously connected with the mobile device, and connected with the mobile device responsive to the vehicle shut down.

3. The method of claim 2, wherein the in-vehicle computing system determines that the user is exiting the vehicle by detecting one or more of a door activity event, a change in pressure at a seat of the vehicle, and a change in humidity in a cabin of the vehicle.

4. The method of claim 2, wherein the in-vehicle computing system determines that the user is exiting the vehicle by determining that a delay time threshold has elapsed after detecting that the vehicle is shut down, the delay time commencing upon the vehicle shut down.

5. The method of claim 1, wherein identifying the mobile device presence in the vehicle further comprises detecting one or more of a signal from the mobile device, motion from a mobile device sensor that is under a movement threshold, and a current connection at a physical connector of the in-vehicle computing system.

6. The method of claim 1, wherein providing one or more of the first alert and the second alert further comprises providing an audible alert from an audio output device of the vehicle.

7. The method of claim 1, wherein providing one or more of the first alert and the second alert further comprises providing a visible alert from a display device of one or more of the vehicle and the in-vehicle computing system.

8. The method of claim 1, wherein providing one or more of the first alert and the second alert further comprises providing an audible alert from an audio output device of the mobile device.

9. The method of claim 1, wherein providing one or more of the first alert and the second alert further comprises providing a visible alert from a display device of the mobile device.

10. The method of claim 1, wherein providing one or more of the first alert and the second alert further comprises preventing one or more vehicle doors from locking.

11. The method of claim 1, further comprising ceasing one or more of the first alert and the second alert after detecting motion of the mobile device exceeding a movement threshold.

12. The method of claim 1, further comprising ceasing one or more of the first alert and the second alert after a threshold period of time has elapsed;
    and sending one or more messages to another mobile device indicating location of the mobile device.

13. An in-vehicle computing system, comprising:
    a processor;
    an inter-vehicle communication module;
    an external device interface; and
    a storage device storing instructions executable by the processor to:
        connect to a mobile device via the external device interface;
        receive information from the mobile device indicating one or more of a user presence and a mobile device presence;
        receive information from one or more vehicle systems of a vehicle via the inter-vehicle communication module;
        detect vehicle shut down separate from engine shut down;
        provide an alert via a moving mobile device remote from the mobile device that the mobile device is located in the vehicle and absent of motion responsive to detecting that the mobile device is located in the vehicle and absent of motion.

14. The in-vehicle computing system of claim 13, wherein the instructions are further executable to provide the alert via a first alert delivery system responsive to detecting the vehicle shut down, the first alert delivery system including one or more of an in-vehicle display device, an in-vehicle speaker system, a mobile device display, and a mobile device speaker system.

15. The in-vehicle computing system of claim 14, wherein the instructions are further executable to detect a user exit after providing the alert via the first alert delivery system.

16. The in-vehicle computing system of claim 15, wherein the alert is a first alert, and wherein the instructions are further executable to provide a second alert via a second alert delivery system responsive to detecting the user exit, the second alert delivery system including an outer-vehicle alert system.

17. The in-vehicle computing system of claim 16, wherein the instructions are further executable to detect movement of the mobile device and cease at least one of the first alert and the second alert responsive to the detected movement.

18. A method of alerting a user to a presence of a mobile device in a vehicle, the method comprising:
- connecting a plurality of mobile devices to an in-vehicle computing system;
- receiving information from each mobile device indicating one or more of a user presence and a mobile device presence for each mobile device;
- receiving information from one or more vehicle systems of the vehicle;
- detecting user exit while at least one mobile device is present in the vehicle;
- detecting that the vehicle is shut down; and
- providing an alert via a moved mobile device of the plurality of mobile devices, the moved mobile device being absent from the vehicle, and the alert indicating that the at least one mobile device is located in the vehicle,
- wherein detecting user exit while at least one mobile device is present includes detecting movement of the moved mobile device of the plurality of mobile devices while the at least one mobile device is stationary, and wherein the detected exit includes at least two passengers exiting the vehicle.

* * * * *